Figure 1:
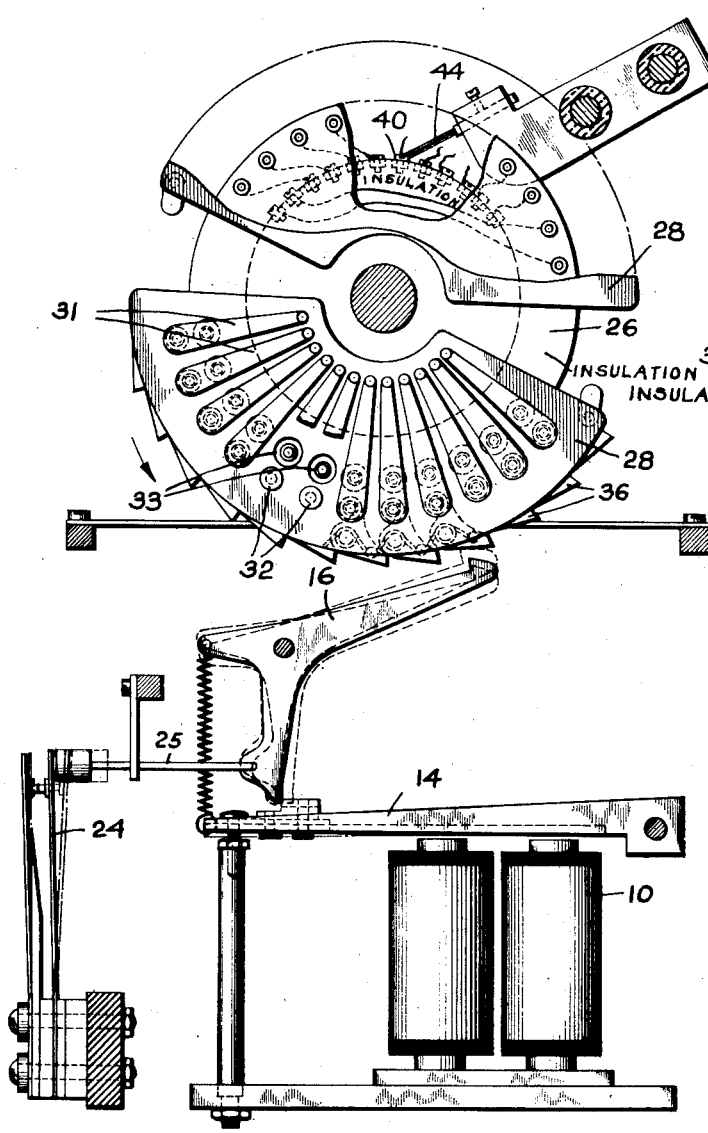

Jan. 8, 1935.    C. CAMPBELL    1,987,322
RECORD CARD CONTROLLED STATISTICAL MACHINE
Filed Dec. 6, 1927    8 Sheets-Sheet 1

Inventor
Charles Campbell
By his Attorney
W. W. Wilson

Jan. 8, 1935. C. CAMPBELL 1,987,322
RECORD CARD CONTROLLED STATISTICAL MACHINE
Filed Dec. 6, 1927 8 Sheets-Sheet 2
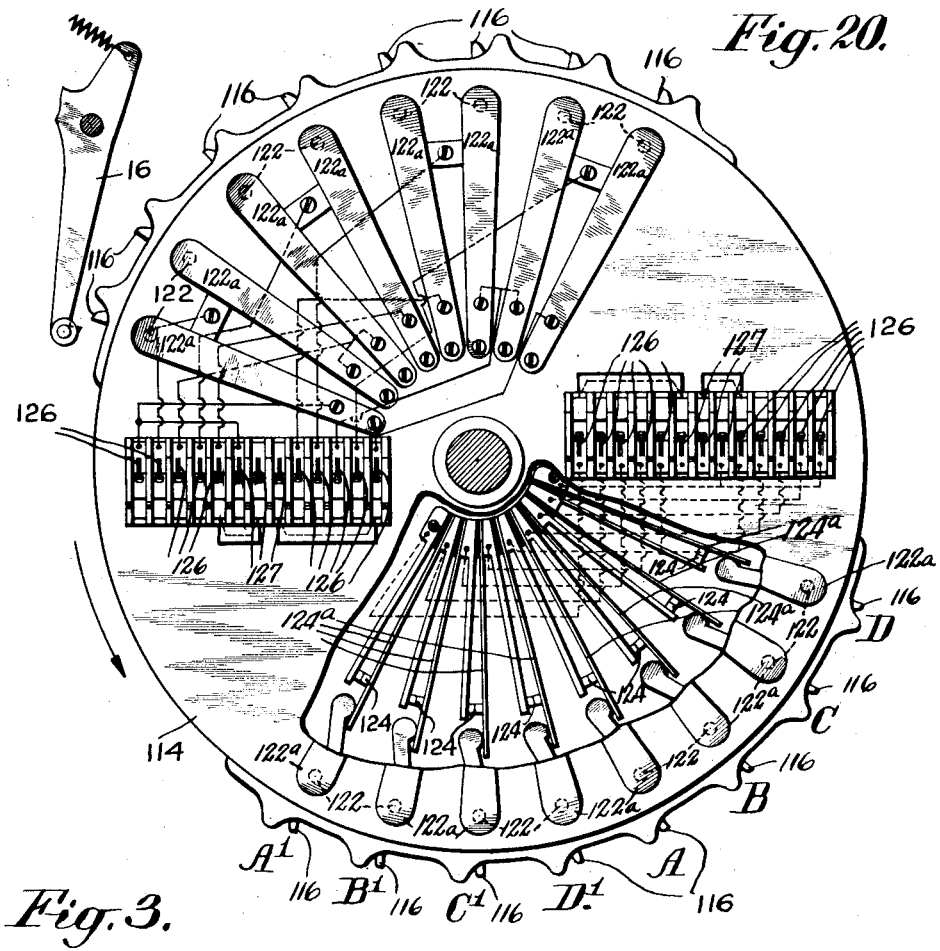
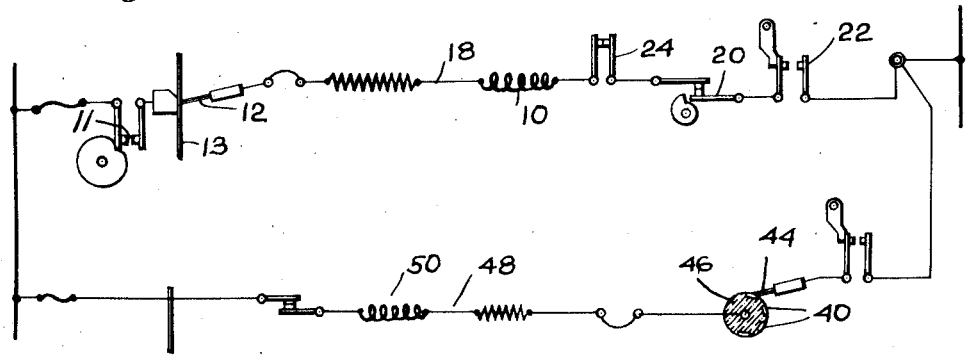

Jan. 8, 1935. C. CAMPBELL 1,987,322
RECORD CARD CONTROLLED STATISTICAL MACHINE
Filed Dec. 6, 1927 8 Sheets-Sheet 3
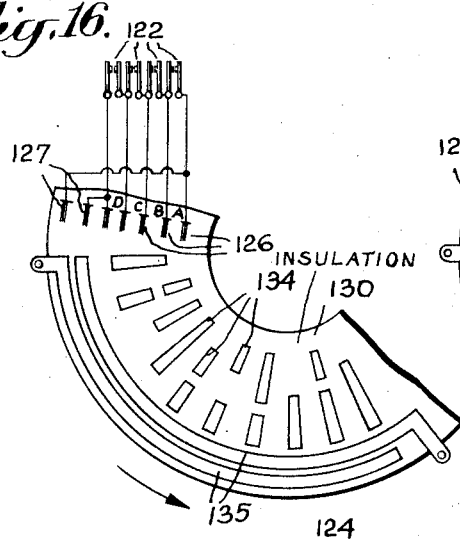
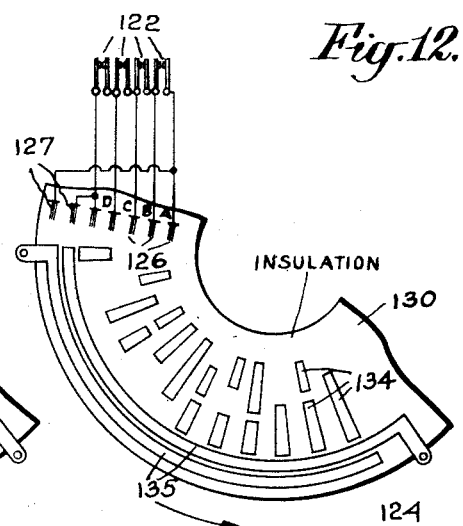
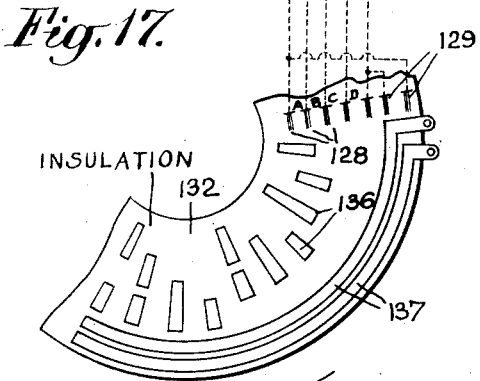
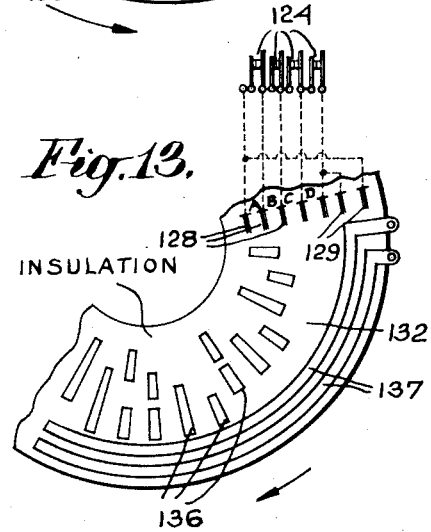
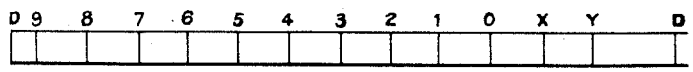
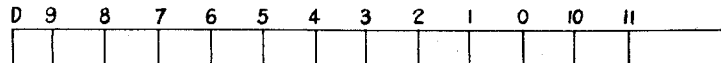
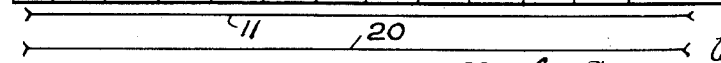

Jan. 8, 1935.  C. CAMPBELL  1,987,322
RECORD CARD CONTROLLED STATISTICAL MACHINE
Filed Dec. 6, 1927   8 Sheets-Sheet 4
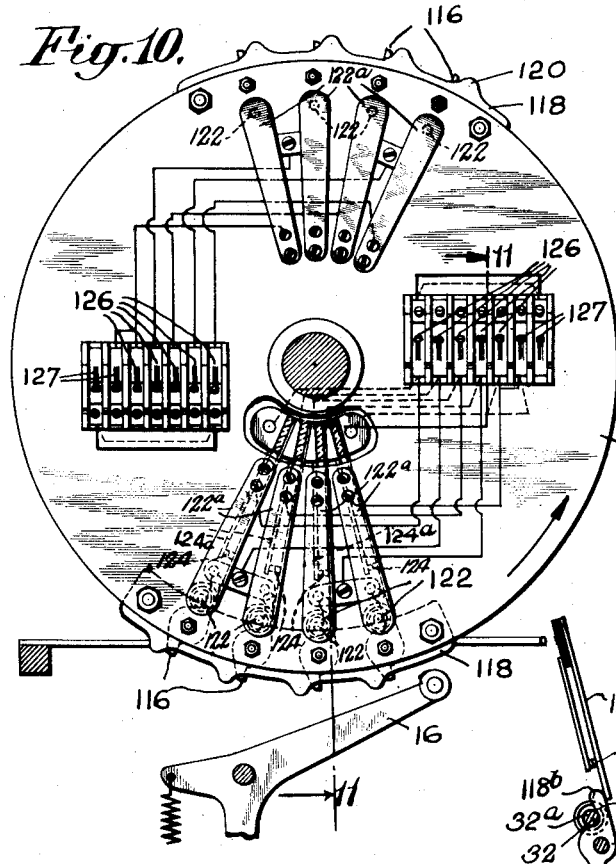
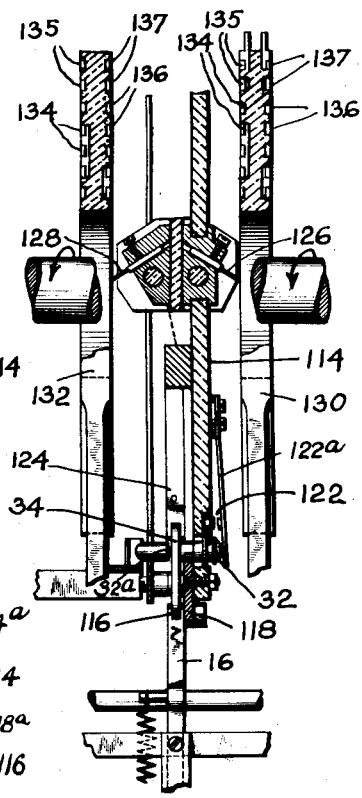
Inventor
Charles Campbell
By his Attorney
W. M. Wilson

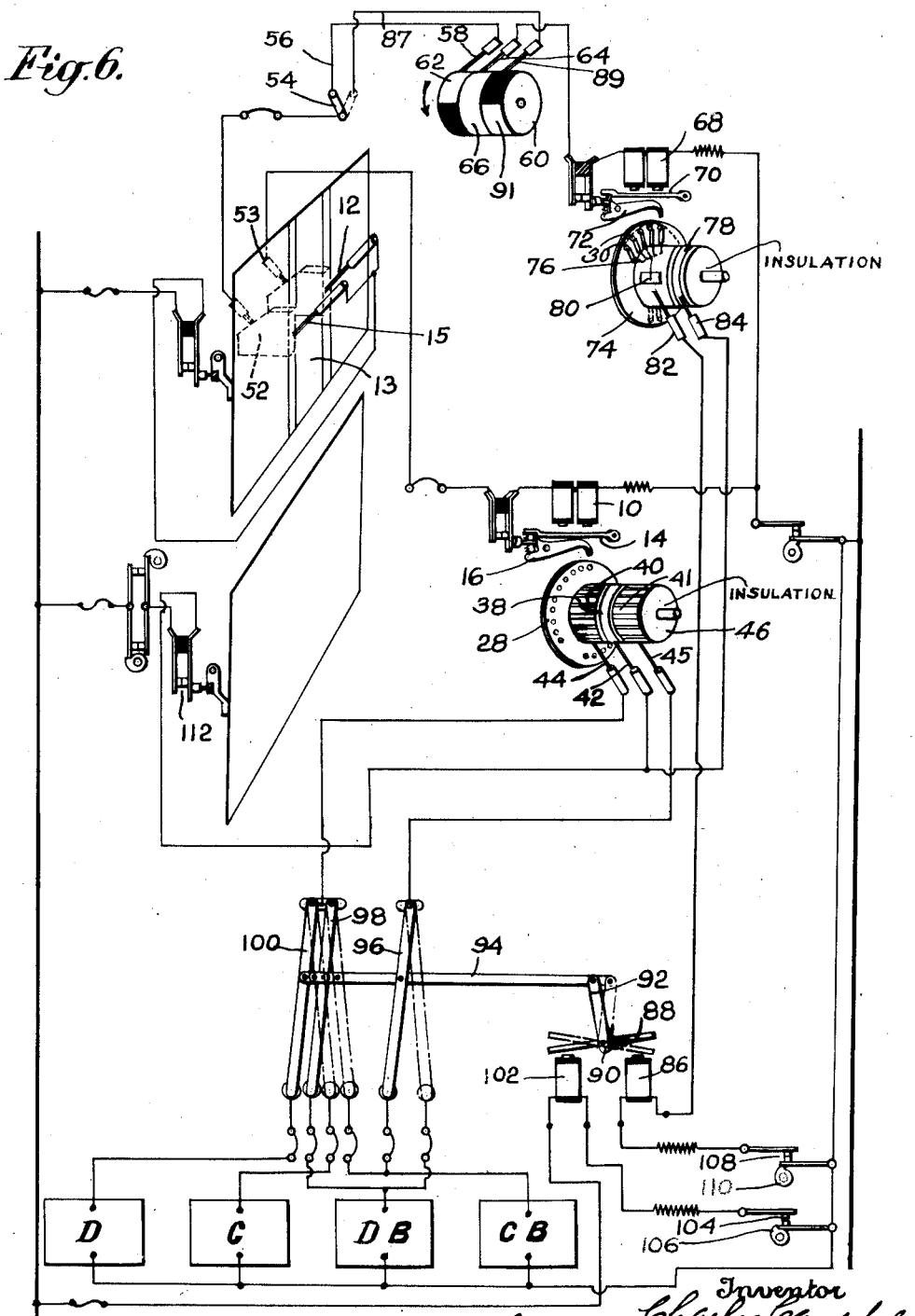

Jan. 8, 1935.  C. CAMPBELL  1,987,322
RECORD CARD CONTROLLED STATISTICAL MACHINE
Filed Dec. 6, 1927   8 Sheets-Sheet 6

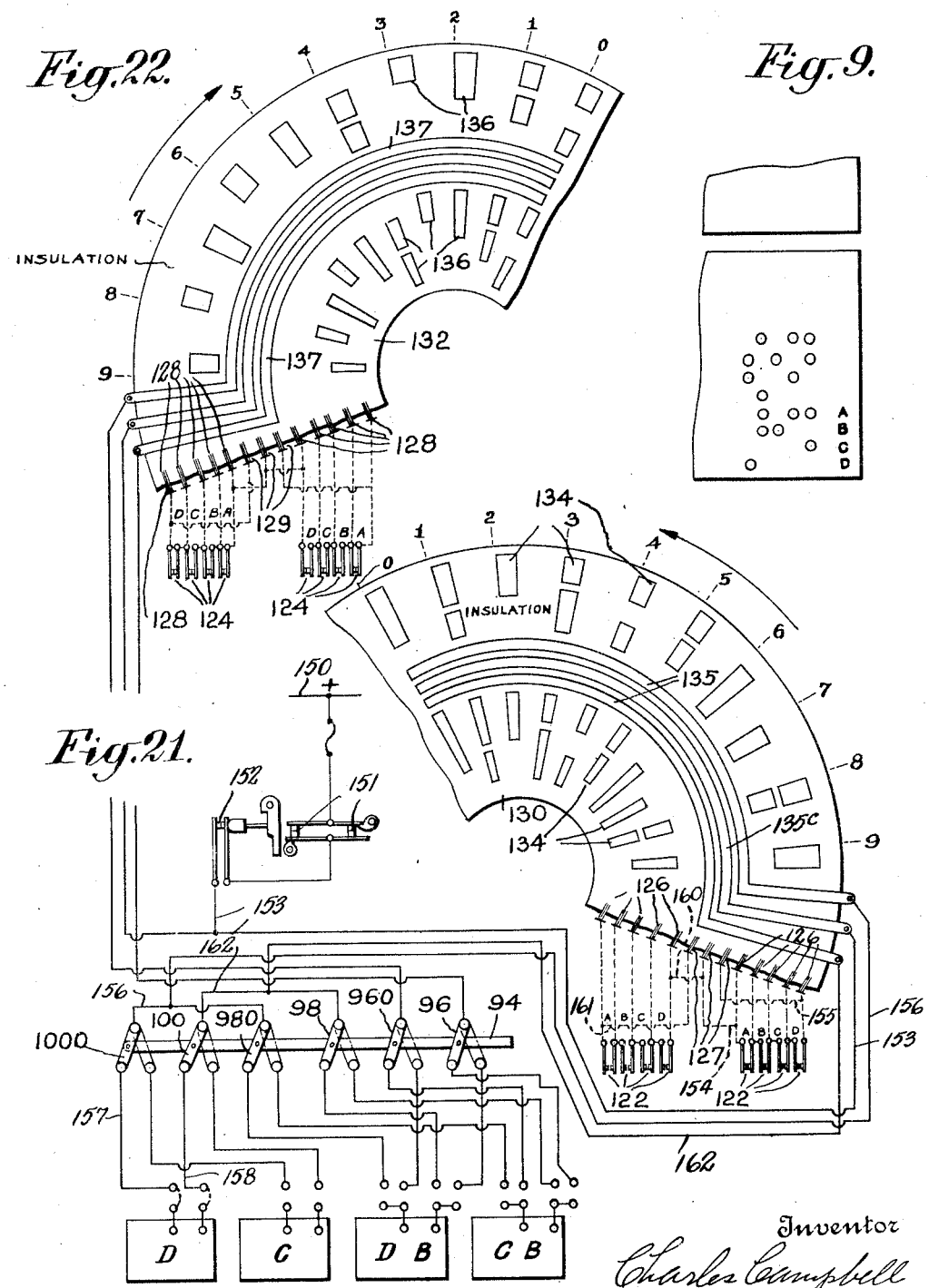

Figures 14, 15, 18, 19:
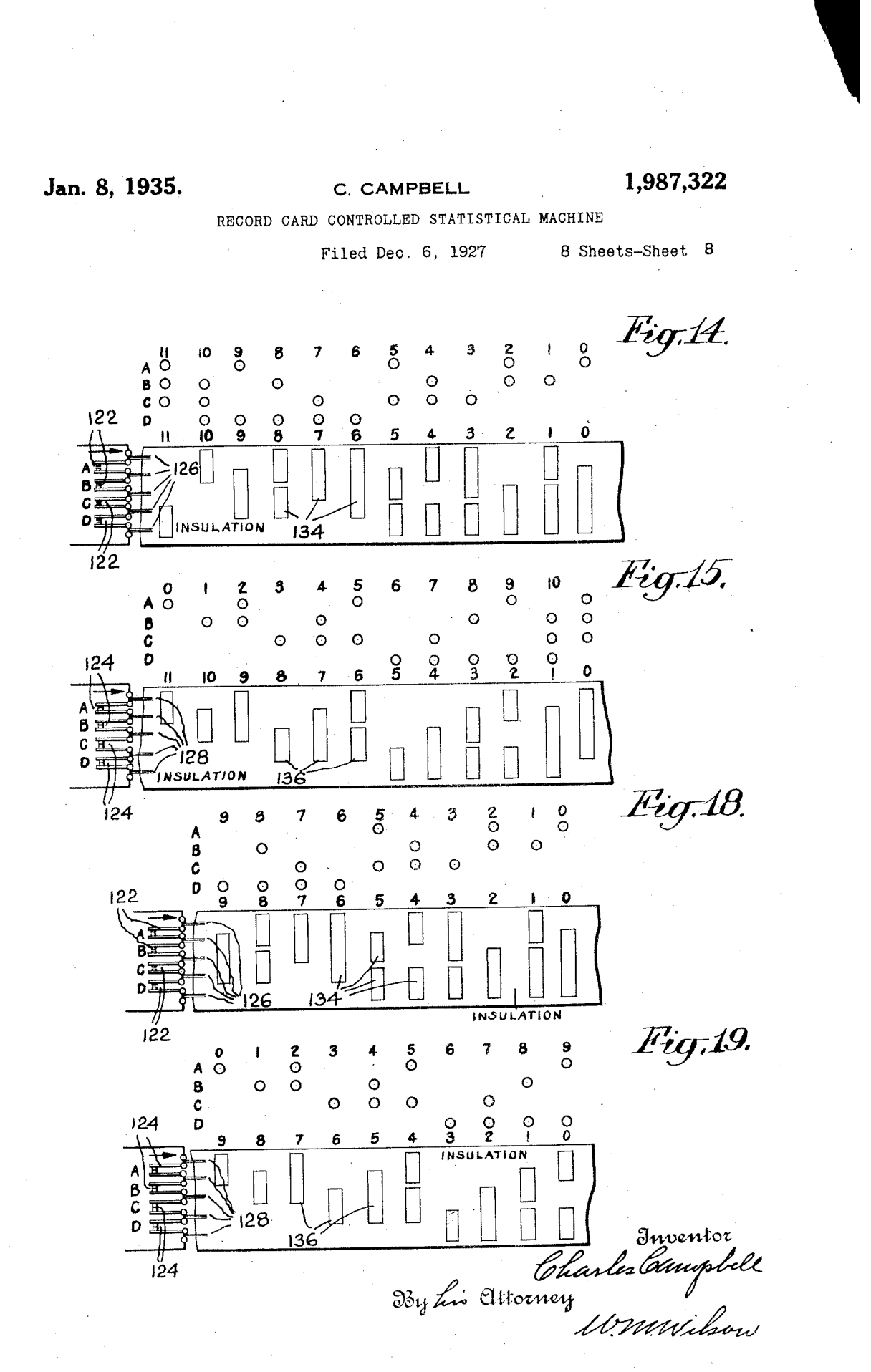

Jan. 8, 1935.                C. CAMPBELL                1,987,322
           RECORD CARD CONTROLLED STATISTICAL MACHINE
                Filed Dec. 6, 1927        8 Sheets-Sheet 8

Inventor
Charles Campbell
By his Attorney
W. M. Wilson

Patented Jan. 8, 1935

1,987,322

UNITED STATES PATENT OFFICE 1,987,322

RECORD CARD CONTROLLED STATISTICAL MACHINE

Charles Campbell, London, England, assignor, by mesne assignments, to International Business Machines Corporation, New York, N. Y., a corporation of New York Application December 6, 1927, Serial No. 238,011 In Great Britain December 31, 1926

35 Claims. (Cl. 235—92)

This invention relates to record-card-controlled statistical machines of the kind in which the operation of the registering or recording device depends upon the time in its cycle of operations at which an operating impulse is transmitted thereto, the said time being determined by the positions of holes in the record-card.

Normally the time of the impulse in relation to the travel of the card is the same as the time in relation to the cycle of operations of the registering or recording device; for example, if a hole occurs in the sixth position in a column of ten hole-positions on a moving card, then the impulse occurs at the sixth of ten successive stages in the cycle of operations of the registering or recording device.

In certain cases the succession of values assigned to hole-positions on the card does not agree with the succession of stages in the cycle of operations of the aforesaid device. Such lack of agreement occurs when it is desired to represent amounts in the duodecimal system (for example pence) on record-cards primarily designed for the decimal system. On the well-known Hollerith card the "leading" hole-position (that which reaches the reading-brush first) is assigned the value 9, the remainder being in reversed numerical order ending with 0. On the part of the card preceding the 9 position there is insufficient room for the two additional hole-positions needed to represent 11 and 10. It is impracticable to reduce the spacing of the hole-positions in a column to make room for the extra two, and if they are placed at the other end of the column, not only will the order of the hole-positions be incorrect (they will pass the reading-brush in the order 9, 8, 7 . . . 1, 0, 10, 11) but the time taken for them to pass the reading-brush is longer than the operative cycle of the registering or recording devices.

One part of the present invention accordingly comprises a device designed to receive an impulse from a record-card at a moment determined only by the position of a hole in the record-card and to emit an impulse at a moment in another similar sequence which differs from the first-mentioned sequence in the length of its time-intervals, for example these intervals are uniformly shortened. In the example referred to, the sequence on the card is 9, 8, 7 . . . 1, 0, 10, 11, and the time-intervals are those suited to the decimal system, namely one-tenth of the operative cycle of the registering or recording device; the sequence in which it is desired to emit the impulse must be in the order 11, 10, 9, 8, 7 . . . 1, 0 and the time-intervals must be one-twelfth of the operative cycle of the registering or recording device.

The "emitting" sequence is preferably timed to occur one whole card-cycle later than the "receiving" sequence.

The invention further relates to record-card-controlled machines of the kind which employ cards having more than one hole in a column, for example Peirce-type cards wherein there are only four hole-positions in a column to represent the nine digits and zero, some of the digits being represented by two holes.

It has been proposed to employ such cards in machines having registering or recording devices operated by timed impulses, by employing a translating device which may take the form of a plurality of contact-blocks traversed by (or traversing) a plurality of contacts or brushes placed by the action of the card-reading devices in an electrical condition corresponding to the particular card-reading. In one such device a plurality of switches was employed, one for each hole-position, and if a hole was present in the card the corresponding switch was caused to close (if normally open) or to open (if normally closed). Thus the switches became in effect a copy of the card, and were compared (by means of brushes connected thereto) with the contact-blocks which represented the code of hole-combinations; when the correct combination was reached an operating circuit was completed and the registering or recording device operated at the correct time in its cycle of operations. Such a device is described and illustrated in the co-pending application of J. W. Bryce, Serial No. 57,099 filed September 18, 1925 now Patent #1,658,024 assigned to the assignee of the present case.

It is an object of the present invention to improve devices of this character, and in particular to enable the amounts represented by holes in the cards to be read as direct amounts and complements simultaneously, and further to enable the capacity of the record-cards to be increased.

Accordingly this part of the present invention comprises a translating device of a dual character one part of which gives indications which are complementary to those given by the other part.

Preferably the translating device is an electrical device as aforesaid and comprises two sets of contact-blocks one arranged as heretofore in the direct order and the other arranged in the reverse order to give indications complementary to those given by the first.

It is preferred to employ two sets of switches, the switches of one set being normally open and those of the other set normally closed and to connect each switch of one set mechanically to the corresponding switch of the other set in such manner that when a switch of one set is closed the corresponding switch of the other set is opened; one set of switches being connected to brushes allocated to the "translating" contact blocks for direct amounts and the other set being connected to brushes allocated to the contact blocks for complementary amounts. Thereby one card-controlled mechanical operation (or plurality of operations) suffices for obtaining both direct and complementary readings simultaneously.

Figure 2:
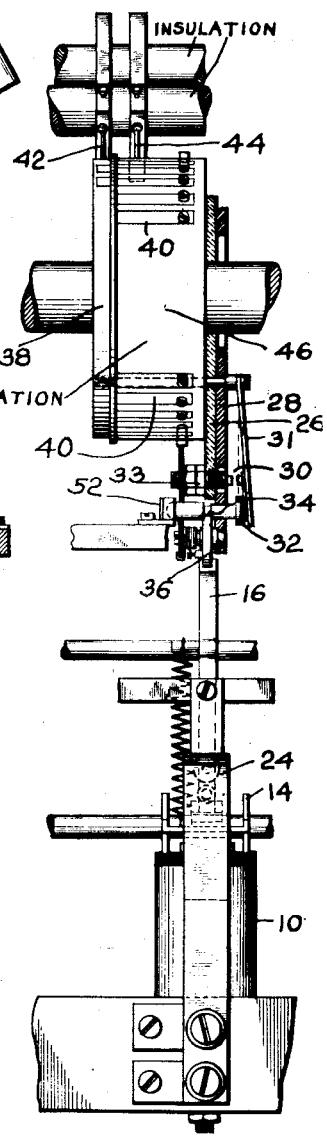
Figure 8:
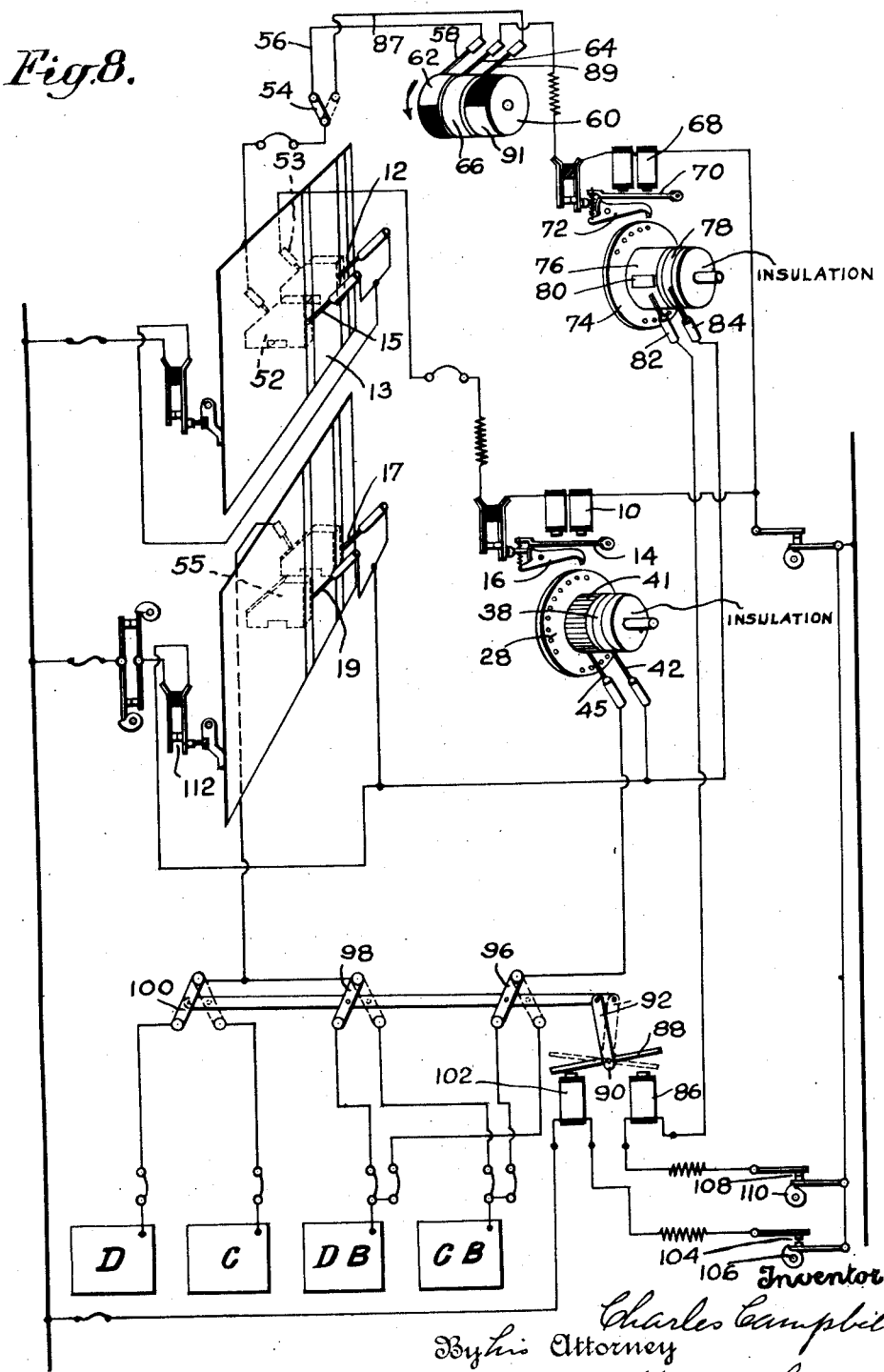

The above and other features of the invention (among which is a construction enabling Peirce-type cards to be sorted in a sorting mechanism primarily intended for Hollerith-type cards) will appear from a consideration of the following description of preferred embodiments thereof, taken in conjunction with the accompanying drawings, in which:

Figure 1 is an end elevation of an impulse-changing device for effecting duo-decimal entries, part being broken away for clearness in showing, Figure 2 is a side elevation partly in section of the device shown in Figure 1, Figure 3 is a circuit diagram, Figure 4 is a timing diagram, Figure 5 is an illustration of a Hollerith card, Figure 6 is a diagrammatic illustration of a machine embodying a single set of control brushes and includes the entry device of Figures 1 and 2 but modified for effecting in the decimal system entries of both direct numbers and complements, Figure 7 is a diagram showing the timing of certain parts of Figure 6, Figure 8 is a view similar to Figure 6 of an alternative construction embodying two sets of control brushes, the entry of direct numbers in this case being controlled by one of the sets of brushes, Figure 9 is an illustration of a part of a Peirce-type card, Figure 10 is a view similar to Figure 1 of a modified form of the invention adapted for use with cards of the combinational hole type shown in Figure 9, Figure 10a is a detail of one of the operating pawls and associated cam contacts, Figure 11 is a side elevation, partly in section, and is taken on the line 11—11 of Figure 10, Figures 12 and 13 are views in end elevation of the commutators shown in Figure 11, Fig. 12 being the commutator for direct numbers in the duo-decimal system and Fig. 13 for complements in the same system, Figures 14 and 15 are diagrams showing in a simplified form, or the "code", the devices of Figures 12 and 13, Figures 16 and 17 are views in end elevation of the commutators for the decimal system of entry, Fig. 16 for direct numbers and Fig. 17 for complements, Figures 18 and 19 are diagrams showing the "code" of the devices of Figures 16 and 17, Figure 20 shows an impulse changing device for combinational hole cards in which two fields of the same card are read at different times, and direct numbers and complements of the number represented by each field entered, Figures 21 and 22 illustrate parts of the commutators of the device of Fig. 20 and show how positive and negative entries as direct numbers and complements are entered in accumulators to derive a balance of such entries.

In Figures 1, 2, 3 and 4 there is illustrated a device, applicable to a statistical machine of the well-known electric type employing Hollerith cards and Hollerith counters, which enables two additional hole-positions to be employed in a column on the card, in order to represent pence.

As is well known, the decimal hole-positions on the Hollerith card (Figure 5) pass the reading-brushes in the order 9, 8, 7 . . . 1, 0. The operative or adding part of the cycle of the counter-wheels is performed in the time taken for the card to travel from 9 to 0. The remainder of this cycle is not available for registering operations. The hole-positions on the record-card are so located that there is no room for the two extra hole-positions preceding the "9" position, and they must be placed at the head of the column, in their wrong numerical order. It is not desirable for practical reasons to change the values assigned to the ten existing hole-positions nor to change the spacing of the holes, which would enable the twelve hole-positions to be placed in their correct order in the column and within the space of ten decimal hole-positions. The mechanism now to be described virtually accomplishes these changes.

An electromagnet 10 is placed in the circuit of the card-reading brush 12 (Figure 3) which reads a twelve-hole column on the card 13. Its armature 14 constitutes a latch for a spring-pressed trip-lever 16. When a hole in a card passes the reading-brush the electromagnet is energized and the trip-lever is unlatched. This is the only operation directly performed by the card-reading circuit. This circuit 18 (Figure 3) also includes the usual cam-contacts 20 and card-lever contacts 22 and also a pair of contacts 24 (see also Figure 1) normally held closed by a rod 25 connected to the trip-lever 16 and arranged to open when the trip-lever is released by the armature 14, thereby interrupting the circuit and preventing sparking at the brushes.

A disc 26 of insulating material carries two sector-shaped metal plates 28 and is mounted to rotate with the edges of the plates 28 in proximity to the hooked end of the trip-lever 16, and is geared to the card-feeding mechanism (not shown) in such a manner that it makes one revolution for two complete card-cycles. Each plate 28 carries a series of twelve spring-closed switches 30 each of which is held open by a plunger 32 having a groove 34 in which engages one end of a pivoted trip-pawl 36 the other end of which projects from the edge of the disc so as to miss the hooked end of the trip-lever when the latter is in the latched position but to engage it when it is unlatched as aforesaid.

The springs 31 carrying the movable contacts of the switches are all electrically connected to the plate 28 which carries them, and the fixed contacts 33 are all insulated from the plates.

When one of the trip-pawls is engaged by the trip-lever it is rotated slightly, thus releasing the plunger 32 and allowing the corresponding switch 30 to close. Continued rotation of the disc causes the trip-pawl to snap past the hooked end of the trip-lever and in so doing to relatch it with the armature 14, the energization of which is only momentary. This movement also recloses the momentarily opened contacts 24, as will be readily apparent.

The twelve trip-pawls are so situated on the disc that each is approaching the end of the trip-lever when the corresponding hole-position on the card is at the reading-brush. Consequently if there is a hole in the card at any one of the twelve positions representing 9, 8, 7 ... 1, 0, 10 and 11 pence respectively, the corresponding switch will be closed. Both plates 28, to which the movable springs 31 of the switches are connected, are themselves connected to a slip ring 38 fixed to the disc. The fixed contacts 33 of each set of twelve switches are connected singly to twelve commutator segments 40 carried by the disc 26, the first switch (in relation to the direction of rotation) being connected to the third segment, the second to the fourth and so on, but the eleventh and twelfth switches are connected respectively to the second and first.

The trip-pawls 36 are spaced apart in such a manner that they all pass a fixed point in the time taken for the twelve hole-positions to pass the reading-brush, but the segments 40 are placed closer together so that they pass a given point in the time taken for the normal ten hole-positions to pass the reading brush.

It will be appreciated that owing to the order in which the switches are connected to the segments, the latter will pass a fixed point in the order 11, 10, 9, 8 ... 1, 0, and that owing to their closer spacing they will pass in the time occupied by the "adding" part of the cycle of a Hollerith counter.

A fixed brush 42 bears upon the slip-ring aforesaid and a similar brush 44 upon the segments which are let into a suitable body 46 of insulating material so as to be flush with its surface, and these two brushes are placed in the operating circuit 48 (Figure 3) of a Hollerith counter adapted for the duodecimal system. It will be clear that when a switch 30 has been closed by the presence of a hole in the card (say the 5 hole in the sequence 9, 8, 7 ... 1, 0, 10, 11) the operating circuit will be closed when the segment connected to that switch makes contact with its brush, with the result that a current impulse will be sent to the counter at a time corresponding to the 5 position in the sequence 11, 10, 9, ... 1, 0.

The fixed brush 44 bearing upon the segments is placed in such a position that the first segment (in relation to the direction of rotation) of one series reaches it at the moment when the first trip pawl of the other series is approaching the trip-lever as will be clear from Fig. 1 if disk 26 is so positioned, or placed at its normal position. The effect of this is that the reading-out of a card designation is performed one card cycle after the reading-in operation of the same designation and during the reading-in of the designation of the succeeding card. Thus the cards may follow one another past the reading brushes with the normal narrow space between them.

The contact 30 which has been closed is re-opened and re-engaged with its trip-pawl by means of a fixed cam-surface 52 (Figure 2) which engages the rounded end of the plunger 32 and pushes it in a direction to open the switch and to bring the groove in the plunger into register with the spring-pressed trip-pawl. This cam-surface is situated just in advance of the trip-lever.

The cam-contacts 20, and a further pair of cam-contacts 11 in the common lead to the contact-block with which the brushes 12 co-operate, are closed just before the "9" position reaches the brushes and are opened just after the "11" position has passed the brushes, as shown in Figure 4.

If direct numbers and complements of decimal amounts are to be read at the same time, there are two sets of segments 40 and 41 the latter as shown in Fig. 6 being carried by an extension of the body 46 shown in Fig. 2, and one wired directly (first to first etc.) and the other wired reversely (first to tenth etc.) and two pairs of brushes connected to two different counters. If there are two distinct sets of card-reading brushes one above the other, one card-cycle apart, only a single reversely-wired set of ten segments is required in each set as will be more particularly described in connection with Fig. 8. In this case the card is read twice, the reading by the upper brushes being given out as a complement one cycle later, and the reading by the lower brushes being made effective directly, synchronously with the delayed first reading.

In the case of duodecimal amounts two sets of twelve segments must be used, if it is desired to obtain both direct and complementary readings, one wired in the manner first described and the other wired reversely—that is to say the first of the first set to the twelfth of the second set, and so on.

When the two readings, direct and complementary are both taken, whether they are decimal or duodecimal amounts, the direct amounts are entered on a "direct" counter and the complementary amounts on a "complementary" counter. A switch may be employed for reversing these connections if desired, and this switch may be operated by an electromagnet under the control of a special hole in one column of the card. If this hole is present, the amount represented in the column which is adjacent the column in which the special hole is provided is to be taken as a negative amount, and its complement therefore must be entered into the "direct" counter and the direct amount into the "complementary" counter. The switch aforesaid is arranged accordingly.

A machine will now be described with reference to the diagram Figure 6, which will enable these results to be obtained.

Referring again to Fig. 5, column No. 20 is set apart for a hole indicating whether the amounts in columns Nos. 21-25 are positive or negative. With the switch 54 in a certain position a hole in column No. 20 in any of the hole positions 4—0 or one in the hole positions 9—5 of one type of card signifies that the amounts are negative or positive, respectively, while with the switch 54 shifted, if there is a hole in the positions 4—0 or one in any one of the hole positions 9—5 the amounts are positive or negative, respectively.

Positive amounts are to be added as direct numbers on a counter C (credit) and added on a balance counter C B (credit balance) and their complements are to be entered on a balance counter D B which of course results in the amount being subtracted from the sum already registered thereby.

Negative amounts are to be added as direct numbers on a counter D (debit) and added on the balance counter D B, while their complements are to be entered into the balance counter C B, thus subtracting the amount from the credit balance. The above method of operation will give a true balance of either positive or negative amounts irrespective of the relative magnitude of the positive and negative entries.

The card 13 is shown in Figure 6 passing reading-brushes 12 for the columns Nos. 21 to 25 (only one of which is shown) and a brush 15 which reads column No. 20. The contact-block 52 with which the brush 15 co-operates is connected through a switch 54, through a wire 56, to a brush 58 which rides on a current-distributor 60 geared to the card-feed devices (not shown) so as to make one revolution per card-cycle. The contact-segment 62 which is under the brush 58 is of such an angular extent that it makes contact with the brush 58 only during the time that the five hole-positions 9 to 5 (positive) in column 20 are passing the brush 15. While the hole-positions 4 to 0 are passing the brush 15 the brush 58 is on an insulating part of the distributor 60.

Another brush 64 bears upon a slip-ring 66 electrically connected to the segment 62. The brush 64 is connected to an electromagnet 68.

It is evident that a card which has a hole in any position from 9 to 5 (indicating positive) in column No. 20 will cause the electromagnet 68 to be energized. If there is a hole in any position from 4 to 0 (indicating negative) the magnet 68 will not be energized. Thus the magnet only responds to "positive" holes, when the switch 54 is in the position shown. The operations which occur when the switch 54 is moved will be referred to later.

The magnet 68 operates an armature 70 which unlatches a trip-lever 72 similar to the trip-lever 16 (Fig. 1) previously described. This trip-lever engages one or other of five trip-pawls (not shown) carried by a rotating disc 74 and operates one of five switches (there are of course two sets of five) similar in construction to the switches 30 previously described. The disc 74 also carries a commutator 76 and a slip-ring 78 and is in most respects like the device described with reference to Figures 1 and 2 except that it has a different number of switches 30 and its commutator has only one pair of segments 80, to each of which all the switches 30 of one set are connected.

Two brushes 82 and 84 co-operate with the commutator 76 and slip-ring 78, to close a circuit of an electromagnet 86 through one of the closed of switches 30 and which electromagnet has an armature 88 pivoted at 90 and having fixed thereto an arm 92 to the end of which is connected a link 94 itself connected to three pivoted switch-arms 96, 98, 100. The armature 88 is extended beyond its pivot and there co-operates with a further magnet 102 energized through contacts 104 closed by a cam 106 for a short period after the passage of the last hole-position of each card, as indicated in Figure 7.

A pair of contacts 108 is placed in the circuit of the magnet 86, and they are closed by a cam 110 immediately after the contacts 104 open (see Figure 7) and opened just after the passage of the "9" position of the next card. The segment 80 previously referred to is under the brush 82 during the time that the contacts 108 are closed.

It will be evident that if the magnet 86 is momentarily energized, consequent on there being a hole in one of the positions 9 to 5, the switch-arms 96, 98, 100 will be pulled into the dotted-line positions and will stay in those positions during the passage of the numeral-hole positions past the brushes 12, and after the last hole-position has passed, the magnet 102 will be momentarily energized thereby returning the switch-arms to the full-line positions. If there is no hole in the 9 to 5 positions (indicating positive) of column No. 20, the switch-arms will not be moved.

Each of the contact-blocks 53 co-operating with the brushes 12 is connected to the electromagnet 10 of a device, only diagrammatically shown in Figure 6, which is similar to that described with reference to Figures 1 and 2. Since in the present case only decimal numbers are being dealt with (it would equally be possible to deal with twelve hole-positions, however) there are only ten trip-pawls in each set and only ten commutator-segments 40 wired to the switches 30 in direct sequence. In addition there is another set of segments 41 wired in reversed sequence, that is the first to the tenth, the second to the ninth and so on.

The brush 44 which bears upon the segments 40 is connected to the switch-arms 98 and 100, and the brush 45 bearing upon the segments 41 is connected to the switch-arm 96. The brush 42 bearing upon the slip-ring 38 is connected to the source of current through card lever contacts 112 which are closed by the cards one cycle later than the reading of the holes of the same card by the brushes 12 and 15 at which time the sets of segments 40 or 41 are emitting a direct number and complement.

It will be seen from the drawing (Figure 6) that when the switch-arms 96, 98, 100 are in the full-line positions they connect the brush 44 to the counters D and D B, while the brush 45 is connected to the counter C B. Thus negative amounts are entered into the counters D and D B as direct numbers and into the counter C B as complements, as was required.

When the switch-arms are in the dotted-line positions (as they are when a "positive" card is being read) due to the energization of magnet 86 by a closing of one of the switches 30 they connect the brush 44 to the counters C and C B, and the brush 45 to the counter D B. Thus positive amounts are entered into the counters C and C B as direct numbers and into the counter D B as complements, also as was required.

The brush 45 which reads the "complementary" commutator-segments 41 for the units denomination may be displaced in relation to those for the other denominations which are in the normal reading position in order to enter an amount which is the complement with respect to ten of the number represented by a hole in the card in the units column.

With the arrangement disclosed in Fig. 6, if a card is presented to the brushes 12 and 15, the former will read out the amount representing perforations to thereby transmit electrical impulses to the magnet 10 so that segments 40 are selected to transmit during the next cycle of operation, impulses representing the direct number and, segments 41 selected for transmitting impulses representing the complement of such numbers. If such a card has no perforation in index positions 5 to 9 of column 20 none of the switches 30 will be closed so that at the termination of the first cycle of operation there will be no circuit connection to magnet 86 when contacts 108 close. Therefore, switches 100 and 96 will remain in the position shown in Fig. 6. During the second cycle of operation, a direct number will be entered under control of brush 44 to the counter D and counter D B and a complement will be transmitted by brush 45 to the counter C B. During the cycle of operation in which amounts are entered as just described, brushes 12 and 15 are analyzing the second card. Brushes 12 thereupon control the setting of certain switches so that by segments 40 and 41 a direct number and a complement of the amount representation on the second card will be entered in the appropriate counter during the third cycle of operation. During the second cycle of operation, if a card happens to be perforated in the five to nine index point positions of column 20, one of the switches 30 will be closed. At the termination of the second cycle of operation as contacts 108 close a circuit connection will be made to magnet 86 through brush 82, segment 80, one of the closed switches 30, ring 78, brush 84 and card lever contacts 112 which are now closed. Thereupon switches 96 and 100 will be shifted to the dotted line position shown in Fig. 6 whereupon during the third cycle of operation, a direct number will be entered in the counter C and in the balance counter C B and the complement entered under control of brush 45 to the balance counter D B. After the entry operation, contacts 104 are closed to thereby energize magnet 102 to bring switches 100 and 96 to their normal positions (shown in full lines in Fig. 6) and the switches are subsequently shifted if the magnet is thereafter energized due to the closure of a switch 30 secured during the previous cycle of operation.

Figure 8 shows an alternative construction wherein a single set of commutator-segments 41 is employed, reversely connected to give complements, and a second set of reading brushes 17, 19 is arranged to read the holes in the cards exactly one card-cycle later than the brushes 12, 15 to enter direct numbers. As in the construction of Figure 6, the brush 45 is connected to the switch-arm 96, which enters the complementary amounts into the balance-counter D B or C B according as the magnet 86 is or is not energized.

The contact-block 55 co-operating with the brush 17 (which reads one of the amount-columns 21 to 25) is connected to the switch-arms 98 and 100, in order to enter the direct amounts into the counters C and C B, or D and D B according as these amounts are positive or negative. The brushes 17, 19 are connected to the brush 84 and are supplied with current through the card-contacts 112.

With respect to the arrangement disclosed in Fig. 8, it will be observed that the manner in which the counters are selected for the entry of direct numbers and complements is precisely the same as is accomplished by the arrangement disclosed in Fig. 6. However, it should be observed that since a single set of reversely wired segments 41 are employed the upper amount reading brushes 12 set up the switches of the commutator so that upon a subsequent cycle of operation the complements will be read out. The entry of direct numbers is effected by the second analyzing of the perforations by brush 17. The entry of direct numbers is therefore obtained during a second cycle of operation and under control of card perforations thus eliminating the direct reading segments 40 of the commutator disclosed in Fig. 6.

The arrangement in Fig. 8 has the disadvantage however that it cannot be employed for the entry of duodecimal amounts because while complements may be emitted by the reversely wired segments 41 which can be spaced to coincide with the ten point spacing of the wheels of the counter which are standardized, the impulses transmitted under control of reading brushes 17 will be according to the spaces of the twelve holes of the card. This spacing is, of course, greater than the ten hole spacing and the counter wheels could not be properly actuated as it would be necessary to operate them at one time under control of a certain time spacing and again, at another time, under control of a different time spacing.

It is apparent that the two constructions may be employed together in the same machine in those cases where some of the amount columns are decimal and one (or more) is a twelve-hole column, the brush 17 for the twelve-hole column being of course idle in so far as the mechanism dealt with herein is concerned.

In both constructions there is a set of switch-arms 96, 98, 100 for each denomination of the card-field being dealt with, and they are operated together by a single pair of magnets 86, 102.

The purpose of the switch 54 may now be explained. When moved to its other position it connects the block 52 to a wire 87 leading to a brush 89 which bears upon a conducting segment 91 so arranged as to be under the brush 89 when the hole-positions 4 to 0 on the card are passing the brush 15. When the switch is in this position the magnet 68 will be energized only if a hole occurs in one of the positions 4 to 0. Thus the credit amounts will be treated as negative and the debit amounts as positive. The possibility of thus reversing the sign of the credit and debit amounts is useful in certain cases, particularly where there is only one balance-counter available. It will be obvious from Fig. 6 that if it is known in advance that the credit items will, in numerical value, exceed the value of the debit items, a single balance counter C B may be used to secure the balance, in the event that the other balance counter D B is otherwise employed. The operation is as described previously in connection with either Fig. 6 or Fig. 8, the operater shifting switch 54 to the full line shown in Fig. 6 or 8. However, if the balance counter C B is employed for other purposes and it is known in advance that the debit items exceed the credit items the balance may be derived upon the balance counter D B. In such instance, the sign reversing switch 54 is shifted to the dotted line position whereby debit items as direct numbers are entered in the counter D B and credit items entered in the balance counter D B as complements, and complementary entries are under control of the perforations at the positions 0 to 4 instead of by the perforations at the 5 to 9 positions.

An arrangement will now be described which will enable direct and complementary amounts to be entered into counters from a moving card of the kind shown in Figure 9, in which twelve numerals 0 to 11 can be represented by one or more holes in four positions A, B, C, D in any column. Such a card is known in the art as a Peirce card. Other holes are shown in the card above the field represented by A, B, C, D; these will be referred to later.

Referring to Figures 10 to 19, a trip-lever 16 operated by a magnet 10 is employed as in the construction described with reference to Figures 1 and 2, together with a disc 114 which is rotated once for every two card-cycles. Each half of the disc carries four trip-pawls 116, instead of twelve as in Figure 1, so spaced that each is approaching the end of the trip-pawl when the corresponding hole-position on the card is at the reading-brush. Two cam-plates 118 are secured to the edge of the disc each having four cam-projections 120 which positively disengage the trip-lever immediately after it has passed the corresponding trip-pawls.

Each trip-pawl is associated with a pair of switches 122, 124 mechanically connected in such a manner that when either is closed the other is open. Those four switches 122 which are normally held open by the trip-pawls as are the switches 30 in Figure 1 will be referred to hereinafter as the "direct" switches; the others, 124, as the "complementary" switches. These latter are opened directly by the tails of the trip-pawls, and held open so long as the latter are held in their tripped positions by the full-diameter portions of the corresponding plungers 32. In the order in which they travel, the trip-pawls and switches will be referred to as D, C, B, A, these being the designations of the hole-positions on the Peirce card in the order in which they pass the reading-brushes in an electrical statistical machine.

As an example, the following code may be employed for the twelve numerals 0 to 11.

```
0—A
1—B
2—A, B
3—C
4—B, C
5—A, C
6—D
7—C, D
8—B, D
9—A, D
10—B, C, D
11—A, B, C
```

This code is illustrated in Figures 14 and 15.
If the holes B, C are present in the card, the "direct" switches B and C will be closed and the "complementary" switches opened, and it is desired to register the direct number 4 and also its complement with respect to 11, namely 7.

Reference is now directed to Figures 14 and 15, in which certain parts of the device are illustrated diagrammatically for the sake of clearness.

The four "direct" switches 122 are electrically connected together in series, as are also the four "complementary" switches 124 shown in the part wiring diagram of Figs. 14 and 15. Each set of four switches 122 and 124 is connected to five brushes 126 and 128 respectively. As shown in Figs. 10 and 11 each set of five brushes 126 or 128 is arranged in a radial row and carried by the rotating disk 114. Thus, as the arrangement is provided in duplicate, there are in the aggregate, four sets of brushes, two sets of brushes 126 for the two sets of switches 122, and two sets of brushes 128 for the two sets of switches 124. The two sets of brushes 126 connected to the two sets of direct switches 122 are on one face of the disk and the two other sets of brushes 128 connected to the two sets of complementary switches 124 are on the opposite face of disk 114.

The outer blade 122a (Fig. 11) of contacts 122 by its coaction with the end of plunger 32 is sufficiently resilient to normally cause said plunger 32 to be shifted to the left (Fig. 11) but is prevented from normally doing so by the engagement of a reduced portion 32a (Fig. 10a) with a cut-out portion 118a (Fig. 10a) of a related trip pawl 116. As a pawl 116 is turned, the related plunger 32 will be shifted and contacts 122 will close. The top part 118b of the pawl engages the resilient blade 124a of related contacts 124 so that shifting of the plunger 32 will cause the full diameter of the same to engage the cut out portion 118a and retain contacts 124 opened while the contacts 122 of the same set is closed.

The connections between the switches and the brushes is the same, whether direct or complementary: each of the three junctions of the four serially connected switches is connected separately to a single one of the three inner brushes of the row of five, and the two extreme (or outer) arms or terminals of the switches are connected severally to the two outer brushes, as clearly shown in Figures 14 and 15. It will be clear, therefore, that if any switch is open, and the other three closed, the circuit can only be completed by bridging the gap between the two brushes which are connected to the two arms of the switch. The three inner brushes are of course each common to the arms of two switches, but each switch corresponds to a gap between two adjacent brushes and these four gaps will be designated D, C, B, A in accordance with the designations of the switches.

On either side of the rotating disc is a fixed disc 130, 132 the surface of which is traversed by the brushes 126, 128 respectively on the face of the rotating disc (114) which faces it, and each disc is provided with two sets of contact-blocks 134, 136 (one for the assembly of switches and brushes on one half of the disc and the other for the assembly on the other half of the disc) let in flush with its surface. Those contact-blocks 134 traversed by the "direct" brushes will be referred to as the "direct" contact-blocks and those, 136, traversed by the "complementary" brushes as the "complementary" contact-blocks.

Parts of the discs 130 and 132, seen from the left and from the right respectively of Figure 11, are shown in Figures 12 and 13.

Each set of contact-blocks comprises twelve radial zones as shown best in Figures 14 and 15 each of which is occupied by either one block or two, the position of a block or arrangement of two blocks being different in each case.

The purpose of the blocks is to bridge the gaps D, C, B, A in accordance with the code set out above and so to complete the circuit in which the brushes are placed in series. Dealing first with the "direct" contact-blocks 134 (Figure 14), it should be explained that the numerical values of the impulse, in the order in which they occur, is 11, 10, 9 . . . 2, 1, 0 to agree with the usual mode of operation of the Hollerith counter. The blocks 134 must be arranged so as to bridge the gap or gaps corresponding to the switch or switches not closed by the holes in the card. The arrangement at each zone may therefore be expressed in tabular form as follows:

| Zone | Value | Gap(s) to be closed |
|---|---|---|
| 1 | 11 | D |
| 2 | 10 | A |
| 3 | 9 | B and C |
| 4 | 8 | A and C (two blocks) |
| 5 | 7 | A and B |
| 6 | 6 | A, B and C |
| 7 | 5 | B and D (two blocks) |
| 8 | 4 | A and D (two blocks) |
| 9 | 3 | A, B and D (two blocks) |
| 10 | 2 | C and D |
| 11 | 1 | A, C and D (two blocks) |
| 12 | 0 | B, C and D |

Dealing now with the "complementary" blocks 136, in each zone the block or blocks must be arranged to bridge the gap corresponding to the switch or switches opened by the holes in the card and the arrangement is as follows (see Figure 15):

| Zone | Value | Gap(s) to be closed |
|---|---|---|
| 1 | 11 | A |
| 2 | 10 | B |
| 3 | 9 | A and B |
| 4 | 8 | C |
| 5 | 7 | B and C |
| 6 | 6 | A and C (two blocks) |
| 7 | 5 | D |
| 8 | 4 | C and D |
| 9 | 3 | B and D (two blocks) |
| 10 | 2 | A and D (two blocks) |
| 11 | 1 | B, C and D |
| 12 | 0 | A, B and C |

Assume that the holes B and C are punched in the card. The "direct" switches B and C will be closed and the "complementary" switches B and C will be opened. It is therefore necessary to bridge the "direct" gaps A and D (Figure 14) and the "complementary" gaps B and C, Figure 15. On referring to the tables and to Figures 14 and 15 it will be seen that the gaps A and D are bridged at the eighth zone, the numerical value of which is 4, while the gaps B and C are bridged at the fifth position, the value of which is 7, namely the complement of 4 with respect to 11.

It will be found that in every case the value of the zone at which the "complementary" gap is closed is the complement with respect to 11 of the value of the zone at which the "direct" gap is closed.

The two outer brushes beyond each set of five are connected to two additional brushes 127, 129 respectively (not shown in Figs. 14 and 15) which bear upon two continuous contact-strips 135, 137 extending the full circumferential length of the twelve zones, and these two contact-strips are placed in the operating circuit of the Hollerith counter or like registering or recording device depending for its operation upon the time of an impulse. Thus such a device may be controlled by an impulse transmitted at a time when a certain block or sets of blocks close a circuit through the previously closed switches.

Although an arrangement has been described suitable for the duodecimal system, it is evident that, the appropriate changes being made, an arrangement suitable for the decimal system would be similar in all respects. The arrangement of the contact-blocks and brushes is shown in Figs. 16 and 17 and diagrammatically in Figs. 18 and 19.

The angular position of the contact-blocks in relation to the brushes which cooperate therewith is such that the brushes which are connected to a set of switches opened (or closed) by a certain card are traversing the contact-blocks while the next succeeding card is being read and is opening (or closing) the switches of the other set.

It will be noted that the various sets of contact-blocks are all situated on the sides of the two fixed discs 130—132 which face each other. The other sides may also be provided with contact-blocks traversed by brushes fixed to rotating discs allocated to other columns on the card. Each fixed disc therefore would bear two sets of "direct" contact-blocks 134 on one side and two sets of "complementary" blocks 136 on the other side.

As will be seen from Fig. 11, the metallic segments or contact blocks 134—136 are embedded in recesses in the disks 130 and 132 so that the faces of the disks 130 and 132 and segments or blocks are substantially flush. These recesses have been omitted from Figs. 12 to 15 for the sake of clearness.

Referring again o Fig. 9, it will be apparent that the space on the card taken up by four-hole columns is only a fraction of the length, in the direction of motion, of a card of the form usually employed in electric statistical machines, and in fact it is possible to use the vacant space for another set of four-hole columns as shown, thereby doubling the capacity of the card. There are in fact still four unused hole-positions at the top of the card, which can be employed for what are known as "designation" purposes, for example for holes indicating that the quantities represented by holes below them are positive or negative.

There will now be described a construction which will enable a card such as is shown in Fig. 9 to be employed to enter into the counters simultaneously the information from the two fields of the card, notwithstanding that the two fields are read at different times, and to enter amounts as direct and complementary numbers, as in the arrangements already described.

Referring to Figs. 20, 21 and 22, it will be seen that since two fields of the same card control entries the arrangement described with reference to Figs. 10 to 17 is duplicated—that is to say the rotating disc 114 has in each set eight trip-pawls 116, eight normally open ("direct") switches 122, eight normally closed ("complementary") switches 124, two sets of five "direct" brushes 126 and two sets of five "complementary" brushes 128, the brushes of each pair of sets being arranged side-by-side along a radius. Part of the disc has been broken away in Fig. 20 to show the switches 124 of one set. The brushes 128 are invisible in this figure, being behind the brushes 126. Each fixed disc 130 carries on its inner face (that seen in Fig. 21) two pairs of identical "direct" contact-block assemblies 134, and similarly each disc 132 carries two pairs of identical "complementary" contact-block assemblies 136. These contact-blocks are shown arranged for the decimal rotation. The assemblies of each pair are arranged "side-by-side" in the radial sense—that is to say corresponding contact-blocks lie along the same radius.

As will be seen from Fig. 20, the first four switches 122 (and 124) are wired, in the manner described previously, to the outer set of brushes (126 or 128) of a pair and the second four switches to the inner set of the same pair.

It will be evident that if there are holes in the first four positions A B C D representing 2 (namely the A and B holes) and holes also representing 2 in the succeeding four positions, the trip-pawls B, A, B¹ and A¹ will be tripped, thus operating the corresponding switches. The brushes of the outer set will therefore complete the counter-circuit at the radial zone marked "2" in Figs. 21 and 22, as will also the brushes of the inner set. In brief, the reading out of the entries of two successive parts of the card is made effective during the same card-cycle, which is the cycle next following the one in which the card is read. Considering the specific example in which the same column comprising two different fields are perforated to represent "2" the direct numbers are entered in separate elements of two accumulators by the following circuit connections.

From the positive line side 150, cam contacts 151, card lever contacts 152, wire 153 to the center segment 135c and to the center brush of the set 127, thence by wire 154 to the left blade of the set of "A" contacts 122 of the right set 122. As there are holes in the A and B positions the A and B switches 122 are closed. By such switches and the related brushes 126 the latter when they arrive at the contact block 134 at the radial position marked "2" they and the contact block will extend the circuit from wire 154 to wire 155 to the extreme right brush 127 and outer segment 135 to wire 156 and by means of switch blade 1000 and wire 157 to the control magnet of one of the accumulating elements of counter D.

As the A and B switches of the left set 122 are also closed since "2" is also represented in the same column in the adjacent field, the magnet of another counter element of the same counter D is controlled by wire 158 by the following circuit connections: By wire 154, a wire 160, the extreme right brush of the left set 126, contact block 134 (of the inner set) at the "2" radial position, the third brush 126 from the left (of the left set 126), thence through closed switches B and A of the left set 122, to a wire 161. Thence by a related brush 127 to the inner segment 135. The latter is connected by a wire 162 to the switch blade 100 which is connected to the wire 158. As is well known, in the Hollerith counter an impulse at a "two" position to the magnet will cause the entry of a value "2".

Somewhat the same circuit connections are made for the commutators for entering complements but as they are similar they need not be described. The only exception is that the blocks 136 are arranged to effect impulses to the magnets of the counter elements at complementary times to thereby enter the complements, to secure balances, by switching devices now to be described.

Of course, in Fig. 21 one side of each of the control magnets of the counters are connected to the other or negative line side, as illustrated in Fig. 6.

A switching arrangement similar to that described with reference to Fig. 6, but duplicated, may be employed for entering the direct and complementary amounts into the counters, in accordance with a hole indicating positive or negative. Such an arrangement is indicated diagrammatically in connection with Figs. 21 and 22, there being four counters D, C, D B and C B as before, each "split" into two parts one for each card-field. A link 94 operated by an electromagnet 86 (see Figs. 6 and 8) actuates six switch-arms 96, 98, 100 and 960, 980 and 1000. The switch arms 96 and 960 are connected to the contact strips 137 pertaining respectively to the inner and outer "complementary" contact-block assemblies 136 and the switch arms 98 and 100, and 980 and 1000, are connected respectively to the contact-strips 135 pertaining respectively to the inner and outer "direct" contact-block assemblies 134.

It will be apparent that this arrangement will operate in the same manner as that previously described with reference to Fig. 6, but in a dual manner. It will also be apparent that a threefold arrangement of the same character could be constructed, to deal with three card-fields, each of four hole-positions, one above the other.

In all the constructions above described with reference to Figs. 10 to 22, the additional unit required to be entered into the units counter-wheel when a complement is registered, may be provided for by arranging the "units" brushes so as to traverse the contact-blocks one zone or interval ahead in relation to all the others, thus causing the counter-wheel to be operated one unit ahead of its normal time of operation. As all the readings are delayed one card cycle, the arrangement described is the equivalent of delaying the units complementary reading one unit-interval less than the normal.

What is claimed is as follows—

1. A translating device comprising a plurality of switches, a carrier for said switches having a different position for each switch and a common operating member for selectively operating one switch at a time dependent upon the position of the carrier, means for shifting said carrier to bring each of said switches into cooperation with said member in succession and commutator mechanism associated with said switches including means for emitting a reading corresponding to the setting of said switches.

2. A translating device comprising a plurality of switches, a carrier for said switches having different positions, one for each switch and a common operating member for selectively operating one switch at a time dependent upon the position of the carrier, means for shifting said carrier to bring each of said switches into cooperation with said member in succession, a commutator having a segment connected to each switch and brushes coacting with the commutator segments to read out the setting of the switches.

3. A translating device comprising a rotatable switch carrier with a plurality of switches mounted thereon, a common switch operating member mounted in proximity to said carrier and means for operating the same when the carrier is in different positions to selectively operate the several switches, commutator mechanism associated with said carrier and comprising a commutator and brush devices rotatable with respect to each other synchronously with said carrier to read out the setting of said switches.

4. A translating device comprising a rotatable switch carrier with a plurality of switches mounted thereon and angularly displaced from each other along a circumferential line, a common switch operating member mounted in proximity to the line of switches and means for operating the same when the carrier is in different positions to selectively operate the several switches, a commutator having segments electrically connected to said switches and means for rotating the commutator synchronously with said carrier and brush mechanism cooperating with the commutator to read out the setting of said switches.

5. A translating device having a plurality of switching devices which are selectively settable, a carrier for said switches a common operating member, means for rotating said carrier for successively presenting said switches to said operating member for selective operation thereby and means for controlling the operating member to set each switch of any combination of said switches as each switch comes into cooperation with said member.

6. In a machine of the class described, a translator device including a series of switching mechanisms and two sets of devices controlled thereby, one set operable to one position in combination to control the emission of direct readings and the other set to an alternative position in inverse combinations to control the emissions of complementary readings, record controlled means for selectively operating said switching mechanisms according to character designations on controlling records and means whereby both sets of devices cause the emission of both direct and complementary readings from said translator device.

7. In a record controlled machine a translator having a series of switches for controlling the emission of received readings in direct form and a series of switches for controlling the emission of received readings in complementary form and common record controlled means for concurrently operating both series of switches.

8. In a record controlled machine, a translator having a series of switches operable in combinations to control the emission of received readings in direct form, a corresponding series of switches equal in number to said first named series interlocked therewith and operable in inverse combinations to control the emission of complementary readings and record controlled means for operating one of said series of switches according to designations on controlling records whereby the interlocked operation of the two series results in control of both direct and complementary emitted readings for a single received reading.

9. A translator having means for receiving readings and means for emitting the same in direct and complementary form, said last named means including a series of switches for controlling the direct emission and another series of switches for controlling the complementary emission and means for calling both of said sets of switches into operation.

10. A record controlled machine including a single record analyzing means for successively searching a plurality of record fields of the same record, a plurality of entry receiving devices corresponding to the several record fields and means intermediate the analyzing means and the entry receiving devices for receiving readings from the analyzing means successively and entering them into the entry receiving devices concurrently.

11. A record controlled machine including an analyzer device for searching a plurality of record fields on a single record successively for combinational representations, a translator device for receiving the readings from the analyzer and entry receiving mechanism controlled by the translator device and means in the translator device for receiving the readings successively from the analyzer device and imparting them to the entry receiving mechanism concurrently.

12. A record controlled machine including an analyzer device for operating successively upon a plurality of record fields of a record while the latter is in motion, each of which may contain combinational index points, entry receiving mechanism, means controlled by the analyzer device successively according to index points on the several record fields and means controlled by said last named means for entering the successively received readings into the entry receiving mechanism concurrently.

13. A record controlled machine including an analyzer device for successively searching the several index point positions of a record field for combinational index points, means for cooperatively presenting a plurality of record fields to the analyzer device successively, means controlled by the analyzer device for receiving readings from several record fields successively and means controlled by said last named means for emitting the successively received readings concurrently.

14. A record controlled machine including record analyzing means for successively searching a plurality of record fields, entry receiving mechanism, means controlled by the analyzing means for receiving successive readings from the several record fields and means controlled by said last named means for concurrently entering readings corresponding to each received reading in direct and complementary form into the entry receiving mechanism.

15. In a translating device, in combination a plurality of sets of switches adapted to be selectively released in combinations to effect a set up, a common releasing member, means for successively presenting said sets of switches to the operating member for selective release and means for controlling the common releasing member to release any combination of a set of switches to effect a certain set up.

16. In a translating device, in combination a plurality of sets of normally open switches, a common member for selectively operating said sets of switches to close the same in predetermined combinations, and means for controlling the common member for selectively causing the closing of said sets of switches in certain combinations as they come into cooperation therewith.

17. In a translating device for a record controlled machine, in combination, a carrier carrying a plurality of normally opened switches, means for rotating said carrier, and record controlled means for selectively closing said switches in predetermined combinations as said carrier is rotated.

18. In a translating device for a record controlled machine, in combination, a plurality of switches selectively settable to represent a predetermined combination, a common member for selectively setting said switches, and a single magnet for operating said member to effect the setting of certain switches to conform to a predetermined combination.

19. In a translating device, in combination, a plurality of switches settable in combinations, a plurality of latches, a single operating device engaging a single latch at a time for selectively setting only certain of said switches, and record controlled means for controlling said operating device whereby only those switches are selectively set which represent a desired combination.

20. A record controlled machine comprising, record analyzing mechanism capable of analyzing records while in motion, entry receiving means comprising a pair of accumulators operable according to a different system of character designation than said records, a single set of devices controlled by the analyzing mechanism and adjustable in accordance with readings received therefrom, and dual controlling means under control of said devices for translating each receiving reading into a plurality of readings having different values in the character designating system pertaining to the entry receiving means for entry therein.

21. A record controlled machine comprising record analyzing mechanism capable of analyzing records while in motion, entry receiving means comprising a pair of accumulators operable according to a different system of character designation than said records, a single set of devices controlled by the analyzing mechanism and adjustable in accordance with readings received therefrom, and a dual controlling means under control of said devices for translating each receiving reading into a direct and a complementary reading in the character designating system pertaining to the entry receiving means for concurrent entry in the accumulators.

22. A record controlled machine comprising record analyzing mechanism operable according to a combinational index point system of character designation, entry receiving mechanism comprising a pair of accumulators operable according to a single index point system of character designation, a single set of devices controlled by the analyzing mechanism and adjustable in accordance with readings received from the controlling records, and dual controlling means under control of said devices for translating each received reading to a corresponding direct and complementary reading in the single index point system of character designation for concurrent entry in the different accumulators of the entry receiving mechanism.

23. A record controlled machine comprising analyzing brushes for successively searching index points on records while in motion according to a combinational system of character designation, entry receiving mechanism comprising a pair of accumulators operable according to a single index point system of character designation, a single set of devices controlled by the analyzing mechanism and adjustable to represent readings from controlling records, and dual translating means under control of said devices for translating each received reading into a corresponding direct and complementary reading in the single index point system of character designation for concurrent entry into the accumulators of the entry receiving mechanism.

24. A record controlled machine comprising analyzing means for searching index points on records according to a combinational index point system of character designation while the records are in motion, entry receiving mechanism comprising a pair of accumulators operable according to a single index point system of character designation, a single set of devices controlled by the analyzing mechanism and adjustable for representing readings from controlling records, and a dual translator under control of said devices for translating each received reading into a corresponding direct and complementary reading in the single index point system of character designation for concurrent entry into the accumulators of the entry receiving mechanism.

25. The invention according to claim 24 in which the translators consist of a dual labyrinth distributor and a single member carrying both distributors one of which emits the direct readings and the other of which emits the complementary readings.

26. In a record controlled machine, analyzing mechanism for searching combinational index point character designations on controlling records, two series of switching mechanisms, one series corresponding in number to combinational index point positions on controlling records, means for releasably restraining each of said switching mechanisms in one of two operative positions, means controlled by the analyzing mechanism for operating the restraining means to cause the operation of one series of switching mechanisms to one of their operative positions in combinations corresponding to character designations on controlling records, means controlled by the series of switching mechanisms operable in combinations corresponding to character designations on records to emit a direct number reading, means controlled by the releasable restraining means to cause the operation of the other series of switching mechanisms in inverse combinations in the other operative position, and means controlled by the other series of switching mechanisms to emit a reading consisting of a complementary value of a character designated by combination index points of a controlling record.

27. In a record controlled machine, record analyzing mechanism, a translator device comprising means controlled by the analyzing mechanism for receiving readings from controlling records and means controlled by said first named means for emitting two readings for each one received, one corresponding to the direct value of a received reading and the other to its complementary value.

28. In a record controlled machine, record analyzing mechanism, a translator device comprising means controlled by said analyzing mechanism for receiving readings from controlling records and means controlled by said first named means for emitting a plurality of readings one of which is different in value than the one received.

29. In an accounting machine, in combination, a plurality of accumulators, a single set of card sensing means, direct and complement number entry means controlled by certain of said sensing means for causing the concurrent disposition of a number represented on a card during a cycle subsequent to the cycle the card is sensed in one of the accumulators as a direct number, and in the other accumulator as a complement of said number, and means under control of certain other of said sensing means for controlling selectively the entry of numbers represented on cards in said accumulators as direct numbers or complements.

30. In an accounting machine, a plurality of data controlled devices, means for analyzing a record for selecting one of the data controlled devices for the entry of a direct number, means whereby the analyzing of the same record causes the setting up of a representation of the record as a direct number to be entered in the selected device, and means for reading out the setting to enter it in the selected device during a cycle subsequent to the analyzing cycle in which the reading was set.

31. In an accounting machine, a plurality of entry receiving devices, means for analyzing a record while in motion for a direct number representation, means for analyzing the record for selecting the entry receiving device to receive the direct number, means for setting up the representation of the direct number, and means under control of said setting means for reading out the representation of the direct number for entry in the selected entry receiving device.

32. The invention according to claim 31 further characterized by the fact that the reading-out means is rotatable and has provisions during its rotation for simultaneously reading out the complement of the direct number for entry in one of the entry receiving devices not selected for reception of direct numbers.

33. In an accounting machine, a pair of entry receiving devices, a single translating device under control of a record having a dual emitter for reading out a representation of the record as a direct number and a complement, and record controlled means whereby said single device effects the entry in one of the selected entry receiving devices as a direct number and as a complement in the other entry receiving device.

34. In a record controlled machine, a pair of accumulators, analyzing means for sensing records of different types, means under control of said analyzing means upon sensing of a record of one type for selecting one accumulator for the entry of direct numbers and the other accumulator for concurrent entry of complements, or for causing, when a record of the other type is sensed, the direct and complement entries with respect to the accumulators to be reversed, means under control of other analyzing means for setting up the direct number and means under control of said setting means for effecting the entries of the direct number and the complement thereof in the appropriate accumulators.

35. A record controlled machine comprising, analyzing mechanism, entry receiving mechanism, a rotary translator mechanism including a plurality of devices one for each designation in a card column and controlled by the analyzing mechanism, only one of said devices being set in a card analyzing operation to represent the designation of the controlling record, and means for reading out said devices singly for converting the received readings into their complementary values by transposing their series order for entry into the entry receiving device.

CHARLES CAMPBELL.